No. 665,566.  
Patented Jan. 8, 1901.  
H. FELDMEIER.  
CHECK CONTROLLED LIQUID DELIVERY APPARATUS.  
(Application filed July 25, 1900.)  
(No Model.)  
3 Sheets—Sheet 1.
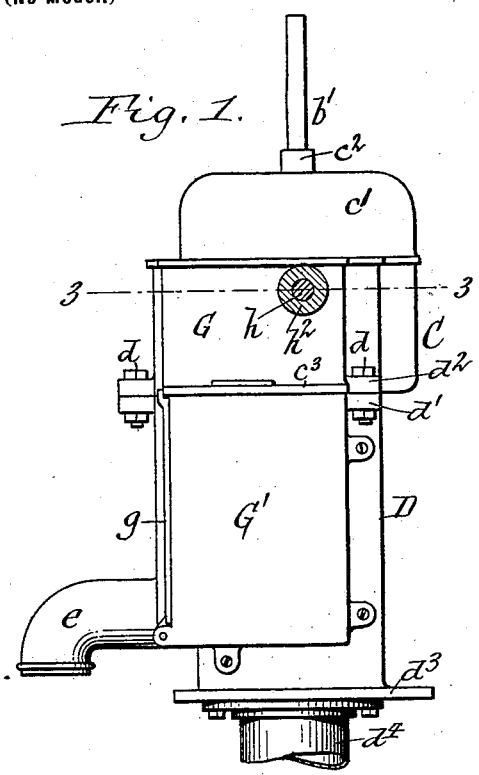
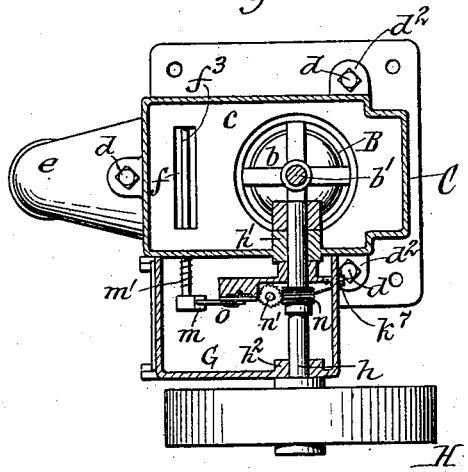
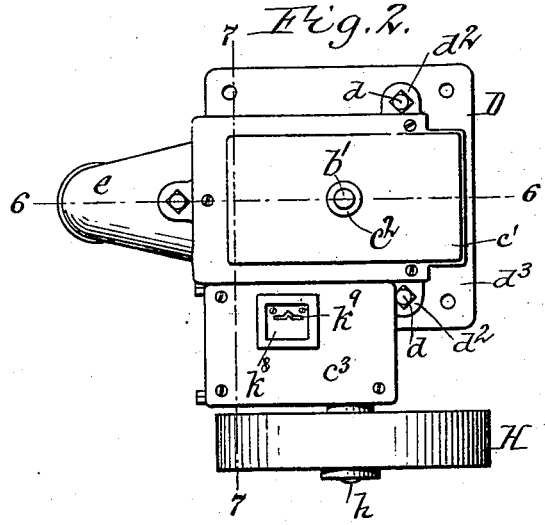
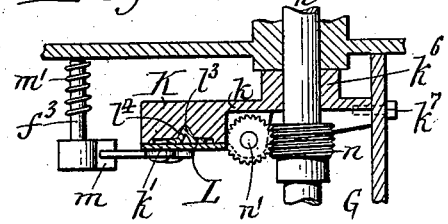
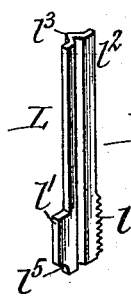
Witnesses:
E. A. Volk.
F. F. Scherzinger.
Harvey Feldmeier Inventor
By Wilhelm Bonner
Attorneys No. 665,566. Patented Jan. 8, 1901.
H. FELDMEIER.
CHECK CONTROLLED LIQUID DELIVERY APPARATUS.
(Application filed July 25, 1900.)

(No Model.) 3 Sheets—Sheet 2.

Witnesses:
E. A. Volk
F. F. Scherzinger

Harvey Feldmeier Inventor
By Wilhelm Bonner
Attorneys

No. 665,566. Patented Jan. 8, 1901.
H. FELDMEIER.
CHECK CONTROLLED LIQUID DELIVERY APPARATUS.
(Application filed July 25, 1900.)
(No Model.) 3 Sheets—Sheet 3.
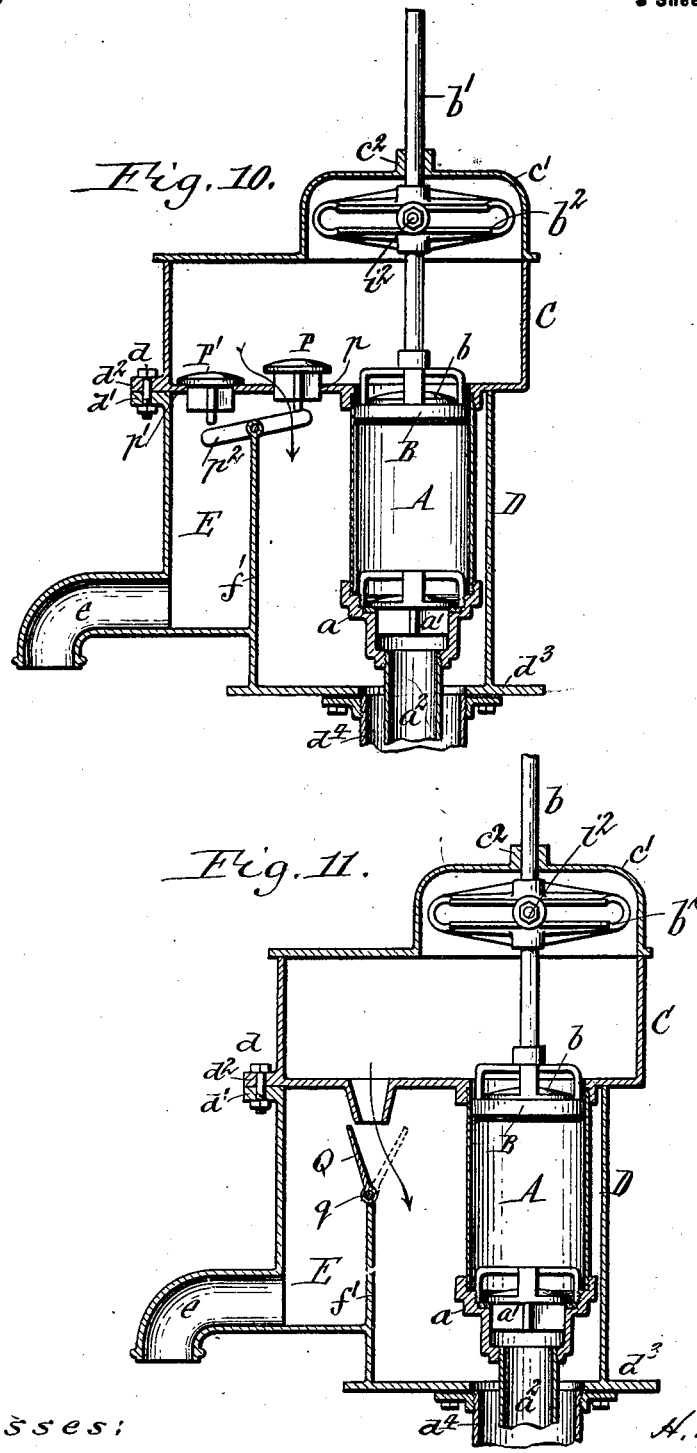
Witnesses:
E. A. Volk.
F. F. Scherzinger
Inventor
H. Feldmeier
By Wilhelm Bonner, Attorneys.

UNITED STATES PATENT OFFICE.

HARVEY FELDMEIER, OF LITTLE FALLS, NEW YORK, ASSIGNOR TO D. H. BURRELL & CO., OF SAME PLACE.

CHECK-CONTROLLED LIQUID-DELIVERY APPARATUS.

SPECIFICATION forming part of Letters Patent No. 665,566, dated January 8, 1901.

Application filed July 25, 1900. Serial No. 24,795. (No model.)

*To all whom it may concern:*

Be it known that I, HARVEY FELDMEIER, a citizen of the United States, and a resident of Little Falls, in the county of Herkimer and State of New York, have invented a new and useful Improvement in Check-Controlled Liquid-Delivery Apparatus, of which the following is a specification.

This invention relates to the class of liquid delivery or dispensing apparatus which are controlled by checks in such manner that the delivery of liquid begins after the insertion of the check and continues until the value of the check is exhausted and which respond to checks of different values, so that the apparatus will deliver different volumes of liquid in accordance with the different values of the checks which are used. Apparatus of this general character are used in creameries for delivering to each patron the amount of skim-milk to which he is entitled for the amount of full milk which he has furnished. As the amounts of skim-milk which are to be returned differ widely in different cases the apparatus must respond to checks differing considerably in value, each patron receiving one or more checks representing the amount of skim-milk which he is entitled to draw from the skim-milk receptacle.

The object of my invention is to produce an apparatus of this general character which is more accurate and more convenient in operation and more durable and less liable to derangement than those heretofore known for this purpose.

Figure 6:
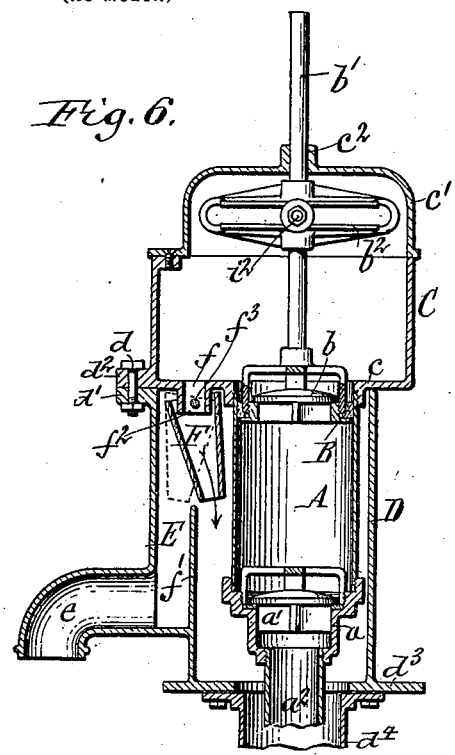
Figure 7:
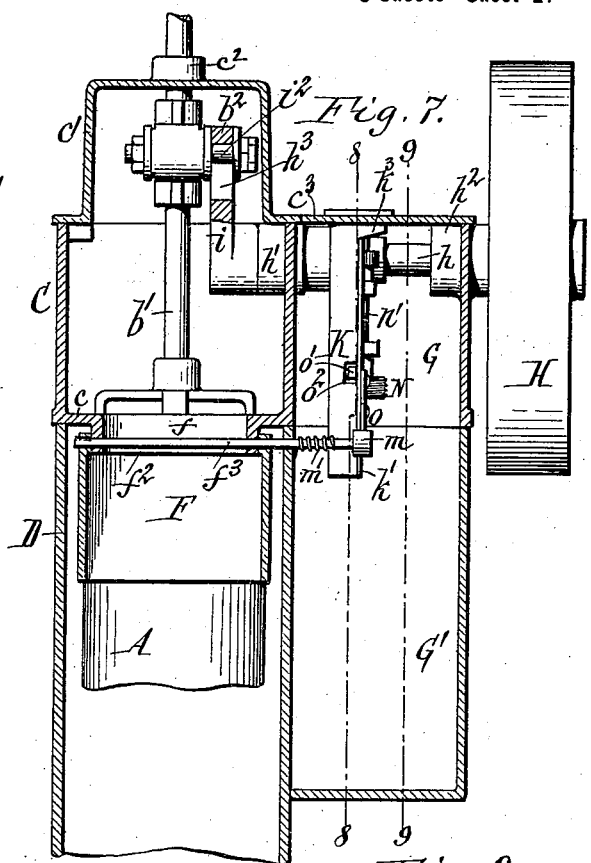
Figure 8:
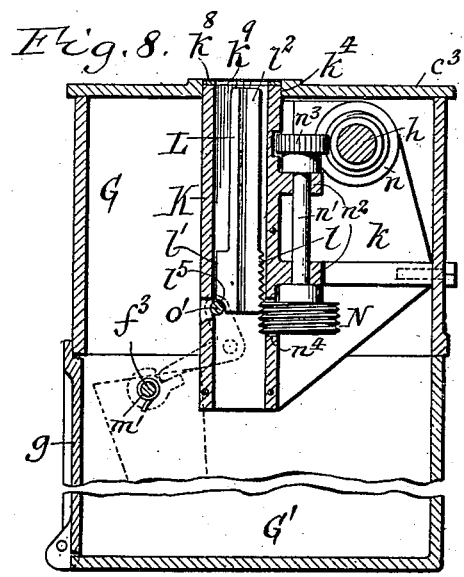
Figure 9:
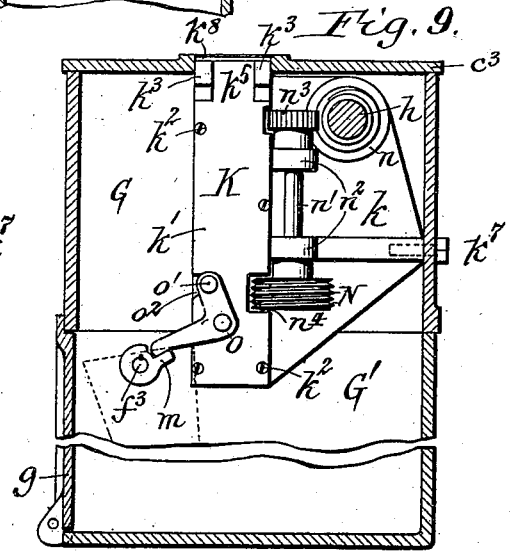

In the accompanying drawings, consisting of three sheets, Figure 1 is a side elevation of my improved check-controlled liquid-delivery apparatus. Fig. 2 is a top plan view thereof. Fig. 3 is a horizontal section in line 3 3, Fig. 1. Fig. 4 is a fragmentary horizontal section in the same line on an enlarged scale. Fig. 5 is a perspective view of the check. Fig. 6 is a vertical section in line 6 6, Fig. 2. Fig. 7 is a vertical section in line 7 7, Fig. 2, on an enlarged scale. Fig. 8 is a vertical section in line 8 8, Fig. 7. Fig. 9 is a vertical section in line 9 9, Fig. 7. Fig. 10 is a sectional elevation showing a modified construction of the flow-directing device. Fig. 11 is a sectional elevation showing another modified construction of the flow-directing device.

Like letters of reference refer to like parts in the several figures.

A represents the upright cylinder of a single acting or lifting pump, $a$ the lower head of the pump-cylinder, which contains the suction-valve $a'$, and $a^2$ the suction-pipe, which extends down into the reservoir from which the skim-milk or other liquid is drawn.

B represents the pump-piston, which is provided with the usual lifting-valve $b$ and secured to the lower end of a vertical pump-rod $b'$, which is provided with a horizontal slotted yoke $b^2$.

C represents the head of the pump-casing, which has its bottom plate $c$ secured to the upper end of the pump-cylinder by any suitable means—for instance, by a screw-joint, as shown—so as to receive the liquid which is lifted by the piston. This head is provided with a removable raised cover $c'$, which accommodates the yoke $b^2$ in its upper position, and with a boss $c^2$, in which the upper portion of the pump-rod is guided.

D represents the body of the pump-casing, which surrounds the pump-cylinder and supports the head C. The pump-cylinder is suspended from the bottom plate $c$ of the head C, which latter rests on the body D and is detachably secured thereto by bolts $d$, passing through ears $d'$ $d^2$ on the body and head.

$d^3$ represents the base-plate of the body D, to which a return-pipe $d^4$ is secured. This pipe is somewhat larger in diameter than the suction-pipe $a^2$, so that a free passage is formed between these pipes which communicates with the lower portion of the body D of the casing. The pipe $d^4$ leads to the receptacle from which the liquid is drawn by the suction-pipe $a^2$ and returns the liquid from the casing D to this receptacle.

When the apparatus can be arranged directly over the receptacle from which the liquid is drawn, the return-pipe $d^4$ can be omitted, because in that case the liquid can descend directly from the bottom of the pump-casing D to the receptacle below.

E represents the upright discharge-passage, which is arranged on the front side of the body D of the casing and provided at its lower end with a projecting discharge nozzle or spout e of any desired form. In the normal position of the parts the liquid which is lifted by the pump passes from the head C of the pump-casing into the body D thereof, and from the latter through the return-pipe $d^4$ or directly back to the receptacle from which it was drawn, and no liquid is delivered from the discharge-passage.

For the purpose of delivering liquid the apparatus is provided with means for directing the stream of liquid temporarily from the return-passage to the discharge-passage. This means for directing or changing the direction of the flow may be variously constructed, and I have illustrated several different means for that purpose.

In the construction represented in Figs. 1 to 9 the bottom of the head C is provided with a discharge-opening $f$, which is arranged over the partition $f'$, by which the discharge-passage E is separated from the return-passage formed by the internal space of the body D of the casing and the return-pipe $d^4$. The partition $f'$ does not extend up to the bottom plate $c$ of the head C of the casing, but leaves underneath said bottom plate sufficient space for a depending movable or flow-directing spout F. The discharge-opening $f$ and the spout F are preferably elongated transversely, as shown. The discharge-opening $f$ is preferably provided with a short downwardly-projecting spout $f^2$, which is inclosed by the upper part of the spout F. The latter is secured to a horizontal rock-shaft $f^3$, which is arranged transversely or parallel with the partition $f'$, so that by rocking the shaft the lower end of the movable spout can be swung from one side of the partition to the other. When the lower end of the flow-directing spout stands on the inner side of the partition $f'$, as shown in full lines in Fig. 6, the liquid flows from the head C through the opening $f$ and the flow-directing spout F into the body D of the casing and from the latter to the reservoir, from which it is drawn and no liquid is delivered by the apparatus, although the pump is working. When the lower end of the flow-directing spout stands on the outer side of the partition $f'$, as shown in dotted lines in Fig. 6, the liquid passes from the flow-directing spout into the discharge-passage E and is delivered by the apparatus.

The apparatus is provided with a check-controlled mechanism by which upon inserting a check the flow-directing spout F is shifted to the discharge-passage and held in this delivery position for a sufficient length of time to deliver the volume of liquid which is called for by the check. When the check is exhausted, the flow-directing spout is automatically returned to its normal position, in which it directs the liquid to the return-passage.

The check-controlled mechanism shown in the drawings is constructed as follows:

G represents the casing of the check-controlled mechanism, which is arranged at one side of the head C of the pump-casing. The casing G may be cast in one piece with the head C.

G' represents the check till or receptacle, which is arranged below the casing G and is secured to the side of the body D of the pump-casing. The casing G is open at the bottom and fits upon the open top of the check-till G'. The latter is provided on its front side with a door $g$, through which the checks are removed from time to time and which is secured by a lock. $C^3$ represents the cover of the casing G.

$h$ represents the horizontal shaft by which the pump is actuated and which is provided at its outer end with a driving-pulley H or with a hand-crank or any other desired driving device. The latter is preferably secured to the shaft by a clutch of any well-known construction, which permits the shaft to be rotated only in the proper direction. The shaft is arranged transversely underneath the covers $c'$ $c^3$ and is journaled in bearings $h'$ $h^2$, formed, respectively, on the walls of the head C and the casing G, Fig. 7. The driving-shaft is provided at its inner end with a crank $i$, which engages by its wrist-pin $i'$ in the slotted yoke $b^2$ of the pump-rod for actuating the latter. The wrist-pin is preferably made adjustable in a slot $h^3$ in the crank, as shown in Fig. 7, so that the effective length of the crank and the stroke of the pump-piston can be increased or reduced at desire.

K, Figs. 3, 4, 7, 8, and 9, represents the vertical check guide or tube into which the checks are inserted and through which they are propelled downwardly.

The checks L used in this apparatus are strips or flat bars of metal which are provided on one edge with a rack-bar or series of teeth $l$, forming the propelling-face of the check, and on the opposite side with a straight or plain back $l'$, which forms the delivery-face of the check, as shown in Figs. 5, 8, and 9. When the propelling and delivery faces of the check are comparatively short, the checks are provided with a handle $l^2$, which is of less width than the body of the check and which enables the user to insert the check conveniently into the check-guide. The checks are preferably provided on one side with a longitudinal rib $l^3$ and the check-guide with a corresponding groove $l^4$, Fig. 4, whereby the user is compelled to insert the check in the proper position for engaging the mechanism. The rib is preferably formed on the check by a corrugation.

The check-guide K is a flat rectangular tube formed at the inner end of a vertical frame $k$, which is arranged at right angles to the shaft $h$. This guide is preferably formed by a shallow vertical channel milled in the inner end of the frame $k$ and forming one of the flat sides and the two narrow upright end walls of the guide or tube, and by a plate $k'$, which closes the channel and is secured by screws $k^2$, as shown in Figs. 8 and 9. The top portion $k^3$ of the check-guide is square, or nearly so, and enters an opening $k^4$ in the cover $c^3$, as shown in Figs. 7, 8, and 9. The plate $k'$ is preferably provided at its upper end with a tenon $k^5$, which enters a recess in the top portion $k^3$ of the guide. The frame $k$ is provided with a bearing $k^6$, by which it is connected with the shaft $h$. The frame is held in place in the casing G by this connection with the shaft and by its projection into the opening $k^4$ of the cover $c^3$. As an additional fastening a screw $k^7$ may be passed through the casing G into the frame $k$.

The upper exposed end of the check-guide is preferably provided as a finish with a brass plate $k^8$, which has a slot $k^9$ for the insertion of the check. This slot is provided with a notch corresponding with the groove $l^4$ of the check-guide. If desired, the groove $l^4$ may be made so large as to clear the rib of the check, in which case the notch in the slot $k^9$ controls the insertion of the check.

The check guide or tube extends downwardly through the casing G into the upper portion of the check-till G', where it terminates at a short distance below the rock-shaft $f^3$ of the flow-directing spout F. This shaft extends through the upright wall of the body D of the pump-casing into the check-till in front of the check-guide and is provided near the latter with a rearwardly-projecting actuating-arm $m$.

$n$ is a worm secured to the driving-shaft $h$ in rear of the check-guide, Figs. 3, 4, 8, and 9.

$n'$ is a vertical shaft which is journaled in bearings $n^2$ on the rear side of the check-guide and which carries at its upper end a gear-wheel $n^3$, which meshes with the worm $n$.

N is a horizontal worm secured to the lower end of the vertical shaft $n'$ and projecting into the check-guide from the rear through a notch $n^4$, formed in the rear wall of the check-guide. The thread of this worm is of such form and pitch that it engages the teeth of the check and propels the latter downwardly through the check-guide.

O is an elbow-lever which is pivoted on one side of the check-guide in rear of the actuating-arm $m$ of the rock-shaft $f^3$, to which the directing-spout is secured. The upper arm of this lever is provided with a horizontal pin $o'$, which projects across the check-guide and plays in a notch $o^2$, formed in the front side of the same. The lower arm of this elbow-lever bears upon the actuating-arm $m$. The flow-directing spout F is held in its normal position by any suitable spring—for instance, as shown in Fig. 7, by a spring $m'$—which is coiled around the shaft and secured to the latter at one end and at the other end to the casing. This spring holds the spout F in the return position, and in doing so the spring causes the arm $m$ to press upwardly against the lower arm of the elbow-lever O, whereby the upper arm of the elbow-lever is held with its pin $o'$ against the bottom of the notch in the check-guide. In this position the pin projects across the open space of the guide, near the front wall thereof, and obstructs the check-passage. The corner $l^5$ of the check at the front end of its delivery-face $l'$ is beveled or curved, so as to press the pin $o'$ out of the way when the check is forced down. The movement imparted thereby to the elbow-lever O depresses the arm $m$ and turns the shaft $f^3$ so far that the flow-directing spout F is shifted from the return-passage to the discharge-passage. The elbow-lever is held in this position and holds the flow-directing spout in the delivery-position while the delivery-face $l'$ of the check travels downward past the pin $o'$. When the upper end of the delivery-face of the check clears the pin, the parts are returned to their normal position by the spring $m'$, and the check, after having cleared the horizontal worm N, drops into the till. When no check is engaged with the worm N, the rotation of the actuating-shaft and of the vertical worm-shaft and the working of the pump produce no delivery of liquid.

It will be understood from the foregoing that the time during which the liquid is diverted into the discharge-passage is proportionate to the length of the delivery-face of the check and that checks differing in the length of their delivery-faces represent correspondingly different values and cause the delivery of correspondingly different volumes of liquid.

The speed with which the check is propelled past the elbow-lever which shifts the flow-directing spout stands in a certain relation to the speed of the driving-shaft and depends upon the pitch of the driving-worm $n$ and the number of teeth in the gear-wheel $n^3$ which meshes therewith. By substituting for these gears others of different proportions the speed of the upright worm-shaft $n'$, the time occupied by the check in passing through the guide, and the volume of liquid delivered for a check are correspondingly decreased or increased. When it is desired to change the value of the checks, this can be readily done by the described change in the gears or by changing the stroke of the pump by means of the adjustable wrist-pin in the crank of the driving-shaft. By changing the gearing the time is increased or reduced during which the flow-directing spout is held in the delivery position. By changing the stroke of the pump the volume of liquid delivered by each revolution of the driving-shaft is increased or reduced.

In the construction of the apparatus represented in Fig. 10 the head C of the pump-casing is provided in its bottom plate with two outlets $p\ p'$, one arranged over the return-passage and the other over the discharge-passage. These outlets are provided, respectively, with lift-valves P P', which open and close these outlets alternately. These valves are raised and lowered alternately by a rock-lever $p^2$, which is arranged underneath the valve at the top of the partition $f'$ and the shaft of which is actuated by the check-controlled mechanism, as described.

In the construction of the apparatus represented in Fig. 11 the flow-directing spout F is replaced by a shifting valve plate or gate Q, which is arranged at the top of the partition $f'$. This plate or gate Q is secured at its lower end to a rock-shaft $q$, which is actuated by the check-controlled mechanism, as described. In one position (represented in full lines) this plate or gate directs the liquid to the return-passage and in the other position (indicated by dotted lines) to the discharge-passage.

In my improved apparatus the working of the mechanism by which the liquid is lifted or propelled is not started and stopped by the insertion of the check, but is independent of the check-controlled mechanism. The pump can therefore be started before the check is inserted, and the user is thereby enabled to assure himself that the pump is fully primed and ready to deliver liquid the moment the check is inserted. The purchaser of liquid is thereby protected against any loss which would arise if the pump should be without priming and the suction-pipe be empty from any cause—leaky valves, for instance, in which case the pump would have to make several dead strokes before delivery could be obtained.

As the operation of the pump is independent of the check-controlled mechanism it can be operated continuously or for a considerable length of time, whether any delivery is wanted or not. The apparatus is for that reason well adapted to be operated by power.

Since the check only changes the direction of the flow of the liquid, neither the insertion of the check nor the discharge of the check produces a shock in the pump mechanism, as is the case in pumps which are unlocked by the check and locked by the discharge of the check or in which the driving mechanism is coupled to the pump upon the insertion of the check and uncoupled upon the discharge of the check. The return-passage need not lead to the same receptacle from which the liquid is drawn, but may lead to another receptacle.

While this invention is described as being used for the delivery of a liquid, I do not wish to limit its use to that specific substance, as it is applicable to the delivery of other flowing materials or substances. The character or construction of the means for setting the flowing material in motion may be varied without departing from the spirit of my invention, and the mechanical features of the check-controlled mechanism may also be changed in various ways.

I claim as my invention—

1. In an apparatus for the delivery of a flowing substance, the combination with a supply-passage, a discharge-passage through which the flowing substance is delivered and a return-passage, of check-controlled means for directing the flowing substance normally to the return-passage and temporarily to said discharge-passage upon the insertion of the check, substantially as set forth.

2. In an apparatus for the delivery of a flowing substance, the combination with a return-passage and a discharge-passage, of a flow-directing device whereby the flowing substance can be directed to either passage, means whereby said flow-directing device is normally held in the return position, and check-controlled means whereby said flow-directing device is shifted to the discharge position, substantially as set forth.

3. In an apparatus for delivering a flowing substance, the combination with means for moving the flowing substance, a return-passage and a discharge-passage, of a flow-directing device whereby the flowing substance can be directed to either passage, means whereby said device is normally held in the return position, a check-guide, means for propelling the check through said guide in unison with the means for moving the flowing substance, and a shifting device which projects into the path of the check and which is actuated by the same to shift the flow-directing device to the delivery position upon the insertion of the check and allows the flow-directing device to return to the return position upon the discharge of the check, substantially as set forth.

4. In an apparatus for delivering a flowing substance, the combination with a return-passage and a discharge-passage, of a flow-directing device whereby the flowing substance can be directed to either passage, a rock-shaft to which said flow-directing device is secured and which is provided with an actuating-arm, a check-guide, a lever engaging said arm and projecting into said guide for engagement by the check, and means for propelling the check through the check-guide, substantially as set forth.

5. The combination with a mechanism for moving a flowing substance, a return-passage, a discharge-passage, and a driving-shaft, of a flow-directing device whereby the flowing substance can be directed to either passage, a check-guide, a check-propelling gear projecting into the path of the check and geared to said driving-shaft, and a shifting device projecting into the path of the check and connected with said flow-directing device, substantially as set forth.

6. The combination with a mechanism for moving a flowing substance, a return-passage, a discharge-passage, and a driving-shaft, of a flow-directing device whereby the flowing substance can be directed to either passage, a check-guide, a check-propelling worm projecting into the path of the check, a shaft to which said worm is secured, a gear-wheel secured to said shaft, a worm on the driving-shaft meshing with said gear-wheel, and a shifting device projecting into the path of the check and connected with said directing device, substantially as set forth.

7. The combination with a mechanism for moving a flowing substance, a return-passage and a discharge-passage, of a flow-directing device whereby the flowing substance can be directed to either passage, a check-guide, a check-propelling device arranged on one side of said check-guide and driven from said mechanism, and a shifting device on the opposite side of the check-guide adapted to be engaged by the check and connected with said flow-directing device, substantially as set forth.

8. The combination with a mechanism for moving a flowing substance, a return-passage and a discharge-passage, of a flow-directing device whereby the flowing substance can be directed to either passage, a check-guide, a check-propelling device which is driven from said mechanism, an elbow-lever arranged on one side of said check-guide and provided with a projection which projects into a notch in the check-guide, a rock-shaft to which said flow-directing device is secured and which is provided with an actuating-arm which is engaged by said elbow-lever, and a spring whereby said directing device is held in the return position and said elbow-lever is held with its projection in the path of the check, substantially as set forth.

9. The combination with the driving-shaft and the check-guide, of an intermediate shaft arranged along said check-guide and provided with a worm which projects into the check-guide and propels the check through the guide, gear-wheels whereby said intermediate shaft is driven from said driving-shaft, and a shifting device which projects into the check-guide and is actuated by the check, substantially as set forth.

10. In an apparatus for delivering a flowing substance, the combination with a return-passage and a discharge-passage, of a movable spout whereby the flowing substance can be directed to either passage, means whereby said spout is normally held in the return position, and check-controlled means whereby said spout is shifted to the discharge position, substantially as set forth.

11. The combination with a pump having a return-passage and a discharge-passage, of a flow-directing device whereby the fluid is normally directed from the pump to the return-passage, and check-controlled means for directing the fluid temporarily from the pump to the discharge-passage, substantially as set forth.

12. The combination with a pump having a chamber into which the fluid is raised and which is provided with an outlet for the fluid, of a return-passage and a discharge-passage arranged below said outlet, a flow-directing device whereby the fluid can be directed to either passage, and check-controlled means for directing the fluid temporarily to the discharge-passage, substantially as set forth.

13. The combination with a pump having a chamber into which the fluid is raised and which is provided with an outlet for the fluid, of a return-passage and a discharge-passage arranged below said outlet, a movable spout arranged between said outlet and said passages and adapted to direct the fluid to either passage, means whereby said spout is normally held to direct the fluid to the return-passage, and check-controlled means for shifting said spout temporarily to the discharge-passage, substantially as set forth.

14. The combination with an upright pump-cylinder, of a head arranged above the same and having an outlet for the fluid, a casing surrounding the pump-cylinder and provided with a return-passage, a discharge-passage arranged on one side of said casing, a flow-directing device for directing the flow from the outlet of the head to said casing or said discharge-passage, and check-controlled means for shifting the flow-directing device, substantially as set forth.

Witness my hand this 23d day of July, 1900.

HARVEY FELDMEIER.

Witnesses:
GRIFFITH PRICHARD,
WM. PARSONSON.